United States Patent
Egly et al.

(10) Patent No.: US 6,382,480 B1
(45) Date of Patent: May 7, 2002

(54) BICYCLE CARRIER APPARATUS ADAPTED FOR USE WITHIN A CARGO AREA OF A VEHICLE

(75) Inventors: David D. Egly, Ferndale; Donald R. Potter, Clarkston, both of MI (US)

(73) Assignee: JAC Products, Inc., Ann Arbor, MI (US)

( * ) Notice: Subject to any disclaimer, the term of this patent is extended or adjusted under 35 U.S.C. 154(b) by 0 days.

(21) Appl. No.: 09/430,646

(22) Filed: Oct. 29, 1999

(51) Int. Cl.$^7$ ................................................ B60R 7/00
(52) U.S. Cl. .................... 224/42.33; 224/310; 224/548; 224/551; 224/571
(58) Field of Search .............................. 224/42.33, 402, 224/403, 281, 537, 310, 548, 550, 551, 564, 571; 414/462, 466

(56) References Cited

U.S. PATENT DOCUMENTS

| | | |
|---|---|---|
| 3,843,001 A | 10/1974 | Willis |
| 3,912,139 A | 10/1975 | Bowman |
| 4,189,274 A | 2/1980 | Shaffer |
| 4,442,961 A | 4/1984 | Bott |
| 4,824,158 A | 4/1989 | Peters et al. |
| 5,417,358 A | 5/1995 | Haselgrove |
| 5,456,396 A | 10/1995 | Allen |
| 5,505,579 A | 4/1996 | Ray et al. |
| 5,649,655 A | 7/1997 | Kerner |
| 5,690,259 A * | 11/1997 | Montani ...................... 224/310 |
| 5,782,391 A * | 7/1998 | Cretcher ...................... 224/310 |
| 6,036,069 A * | 3/2000 | Sayegh ........................ 224/324 |
| 6,099,232 A * | 8/2000 | Dixon et al. ............ 414/462 X |

\* cited by examiner

*Primary Examiner*—Stephen K. Cronin
*Assistant Examiner*—Maerewa W. Brevard
(74) *Attorney, Agent, or Firm*—Harness, Dickey & Pierce, PLC (57) ABSTRACT

A bicycle carrier apparatus for carrying a bicycle in an upright orientation within a cargo area of a vehicle such as a minivan, sport utility vehicle or pickup truck. The apparatus includes a generally U-shaped or V-shaped, elongated lower rail which is fixedly secured to a floor of a cargo area of the vehicle. An upper U-shaped or V-shaped rail is slidably disposed on the lower rail. The lower rail includes a first pair of rollers and the upper rail includes an additional pair of rollers which cooperate to enable smooth sliding movement of the upper rail along the lower rail. A mechanism disposed on the upper rail is adapted to engage the front fork of a bicycle when the front wheel is removed and the remainder of the bicycle is placed on the apparatus. The rear wheel of the bicycle fits within the upper rail so that the bicycle can be held securely in an upright position once its front fork is secured to the upper rail. Loading and unloading of the bicycle carrier apparatus can be accomplished by an individual while standing on a ground surface outside of the vehicle. Thus, there is no need for the individual to climb into the cargo area of the vehicle to accomplish loading or unloading of the bicycle. Maintaining the bicycle in an upright position also enables the most efficient use of the remaining cargo area of the vehicle. When the apparatus is not in use it forms a relatively unobtrusive structure which takes up very little cargo space so that the cargo area can be used substantially as if the apparatus were not present.

17 Claims, 5 Drawing Sheets

BICYCLE CARRIER APPARATUS ADAPTED FOR USE WITHIN A CARGO AREA OF A VEHICLE

BACKGROUND OF THE INVENTION

1. Technical Field

This invention relates to bicycle carrying apparatuses, and more particularly to a bicycle carrier apparatus specifically adapted for use within a cargo area of a motor vehicle such as a minivan.

2. Discussion

A wide variety of bicycle carriers are presently available for use with motor vehicles. Such bicycle carriers typically allow one or more bicycles to be supported on one or more support members positioned on a roof portion of the vehicle or behind the vehicle over the rear bumper of the vehicle. Usually, such bicycle carriers require the addition of significant structure for allowing the bicycle to be supported on the vehicle. Often times this structure is time consuming and/or cumbersome to install. Occasionally, such bicycle carrying devices also can interfere with opening or closing a portion of the vehicle such as a rear liftgate of a minivan or sport utility vehicle.

The alternative of transporting a bicycle within the interior area of a vehicle also has drawbacks. A major drawback is the inconvenience of having to lift and position the bicycle in the cargo area of the vehicle, which is often not easily accomplished when standing outside the vehicle on a ground surface. Thus, the individual often must climb into the cargo area of the vehicle after lifting a portion of the bicycle into the cargo area to complete the positioning of the bicycle within the cargo area. Since most individuals are not able to stand upright in the cargo area, this also adds to the difficulty and inconvenience of trying to lift and/or position the bicycle while in a bent over position in the cargo area.

Even when a bicycle is able to be fully positioned within the cargo area of a vehicle, there is usually no means for securely holding the bicycle in a stable position. Thus, the bicycle may simply have to be leaned against some portion of the cargo area or laid down in the cargo area. This can result in vibration and other undesirable noise while the vehicle is moving. It also makes for very inefficient use of the space within the cargo area since the bicycle, if leaning or laid down on its side, can take up a good portion of the available cargo space.

It would therefore be highly desirable to provide a bicycle carrier adapted for use within a cargo area of a vehicle such as a minivan, sport utility vehicle or pickup truck. More specifically, it would be highly desirable to provide a bicycle carrier which allows an individual to conveniently load the bicycle thereon while standing outside of the vehicle on a ground surface, and then to easily slide the entire bicycle into the cargo area without the inconvenience of having to climb into the cargo area and lift or position the bicycle into a stable, secure position.

It is a further object of the present invention to provide a bicycle carrying apparatus that supports a bicycle in a stable, upright manner within a cargo area of a vehicle such as a minivan, sport utility vehicle or pickup truck, to thereby enable the most efficient use of the vehicle's cargo area.

It is still another object of the present invention to provide a bicycle carrying apparatus adapted for use with a cargo area of a motor vehicle which allows a bicycle to be loaded thereon in a secure upright position, and then moved slidably into the interior of a cargo area of the vehicle without requiring the user to climb into the cargo area. It is a further object to permit a bicycle loaded onto the apparatus as just described to be pulled slidably out of the back of the vehicle and removed from the apparatus such that an individual is not required to climb into the cargo area to remove the vehicle.

SUMMARY OF THE INVENTION

The above and other objects are provided by a bicycle carrier apparatus in accordance with the preferred embodiments of the present invention. In one preferred embodiment the apparatus comprises a first elongated rail adapted to be fixedly secured to a floor of a cargo area of a vehicle, such as within a cargo area of a minivan, sport utility vehicle or even a pickup truck. The first elongated rail includes at least one roller for movably supporting a second elongated rail disposed on the first elongated rail. The second elongated rail is preferably U-shaped or V-shaped and is able to accept a bicycle tire of a bicycle therein. The second elongated rail also includes structure for attaching to a front fork of the bicycle once the front wheel of the bicycle is removed. In this manner the bicycle is supported securely in an upright position when mounted on the second elongated rail.

At least one roller permits the second rail to be moved slidably outwardly of the first elongated rail. This allows the bicycle to be mounted on the second elongated rail when it is in its extended position relative to the first elongated rail. Once the bicycle is mounted securely on the second elongated rail, then the second elongated rail can be pushed slidably into its fully retracted position within the cargo area of the vehicle. Thus, the user is not required to climb into the cargo area in order to load the bicycle therein.

When the bicycle is to be removed, the user disengages a locking mechanism which allows the second elongated rail to be pulled slidably out from the cargo area of the vehicle. The bicycle can then be detached from the second elongated rail and placed on a ground surface. Thus, unloading and removal of a bicycle from the apparatus also does not require the user to climb into the cargo area. Importantly, when the bicycle is secured on the apparatus and positioned within the cargo area, the bicycle is held securely in an upright position. This makes for the most efficient use of the remaining available cargo space in the cargo area for other items.

In one preferred embodiment the first elongated rail includes a pair of rollers for movably supporting the second elongated rail. In this embodiment the second elongated rail also includes a pair of rollers adapted to engage a pair of flanges formed on the first elongated rail. The second pair of rollers help to maintain the second elongated rail in a generally horizontal position when the second elongated rail is in a fully extended position relative to the first elongated rail.

The apparatus is extremely compact and does not significantly interfere with placement of other articles in the cargo area of a vehicle when it is not in use. The bicycle carrier apparatus of the present invention is also light in weight and easy to install either on a factory assembly line, by service personnel at a vehicle dealership or by an individual with limited tools and mechanical know how.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
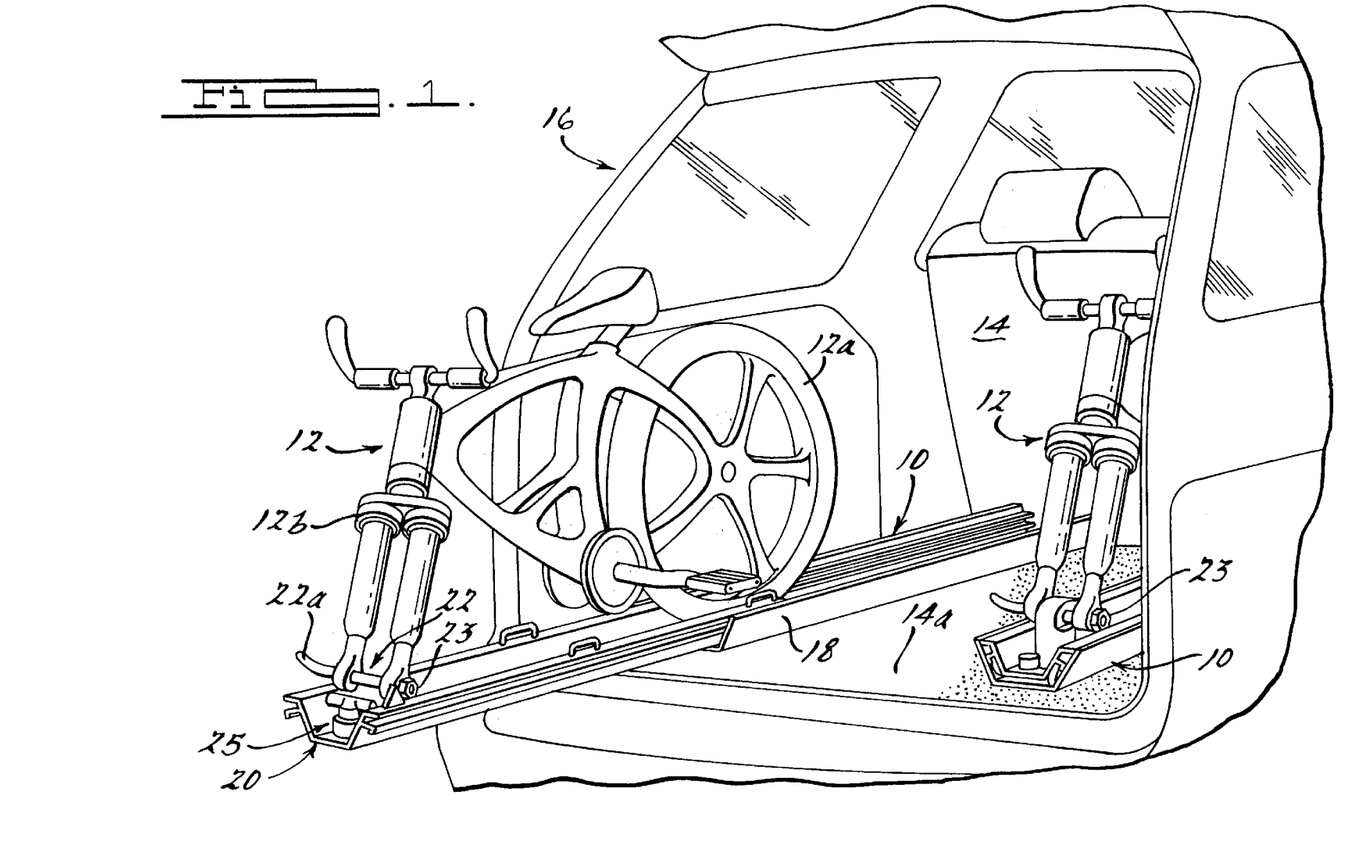
FIG. 1 is a perspective view of a rear portion of a vehicle such as a minivan illustrating a pair of bicycle carrier apparatuses of the present invention, with one supporting a bicycle in a fully extended position and the other supporting a bicycle within a cargo area of the vehicle.

Referring to FIG. 1, there are shown a pair of bicycle carrying apparatuses 10 in accordance with a preferred embodiment of the present invention. Each apparatus 10 is shown supporting a bicycle 12 (having its front wheel removed) thereon in an upright position within a cargo area 14 of a motor vehicle 16 such as a minivan. It will be appreciated immediately, however, that the apparatus 10 is equally suited for use in the cargo area of a sport utility vehicle or even a pickup truck. The apparatus 10 enables a bicycle to be conveniently and easily loaded by an individual while standing on a ground surface outside of the vehicle such that there is no need for the individual to climb into the cargo area 14 to load and/or position the bicycle 12 therein either during loading or unloading of the bicycle 12. While two apparatuses 10 are shown, it will be appreciated that one, or possibly three or more, apparatuses can be disposed within the cargo area 14 depending on the overall number of bicycles 12 that the user needs to transport and the overall dimensions of the cargo area 14.

With further reference to FIG. 1, the apparatus 10 includes a first or lower, generally U-shaped or V-shaped elongated rail 18 which is fixedly mounted to a floor 14a of the cargo area 14. Disposed movably on the lower rail 18 is a similarly shaped second, or upper, elongated rail 20. The upper rail 20 can be extended into the position shown to allow a substantial portion of the bicycle 12 to be presented outwardly of the cargo area 14 for easy removal from the upper rail 20 or placement thereon.

The generally U-shape or V-shape of the upper rail 20 is sufficiently wide to allow a rear wheel 12a of the bicycle 12 to be positioned therein. Front fork 12b of the bicycle 12 is releasably secured to a mechanism 22 which permits the fork 12b to be quickly secured to and released therefrom. Mechanism 22 includes a suitable clamping assembly which clamps the tines of the fork 12b thereto when lever 22a is moved from a locked to an unlocked position. This clamping mechanism is well known and no further description shall be provided for this component. The mechanism 22 is fixedly secured to the upper rail 20. The mechanism 22 thus serves to hold the bicycle 12 securely in an upright position so that no external fastening cords or straps need to be used to maintain the bicycle 12 in an upright position within the cargo area 14. Alternatively, a shaft could just be provided on which the tines of the fork 12b engage and threaded bolts 23 (only one being visible) used to clamp the fork 12b thereto. A manually engageable locking mechanism 25 maintains the upper rail 20 in its retracted position.

In FIG. 1, the rightmost bicycle carrier apparatus 10 is shown in its fully retracted position showing a bicycle 12 positioned entirely within the cargo area 14 of the vehicle 16. It will be appreciated, then, that the apparatus 10 permits the most efficient use of the remaining cargo space in the cargo area 14 by maintaining the bicycle 12 in its upright position. The apparatus 10 further eliminates the need for complicated and obtrusive support structure to be secured to the rear bumper of the vehicle or possibly to a towing hitch, which would likely impede access to the cargo area 14. Advantageously, the overall low profile of the apparatus 10 takes up very little cargo space when the apparatus is not being used to support a bicycle thereon. Other cargo can therefore be placed on top of the upper rail 18 of the apparatus 10 when the apparatus is not being used to support a bicycle.

Figure 2:
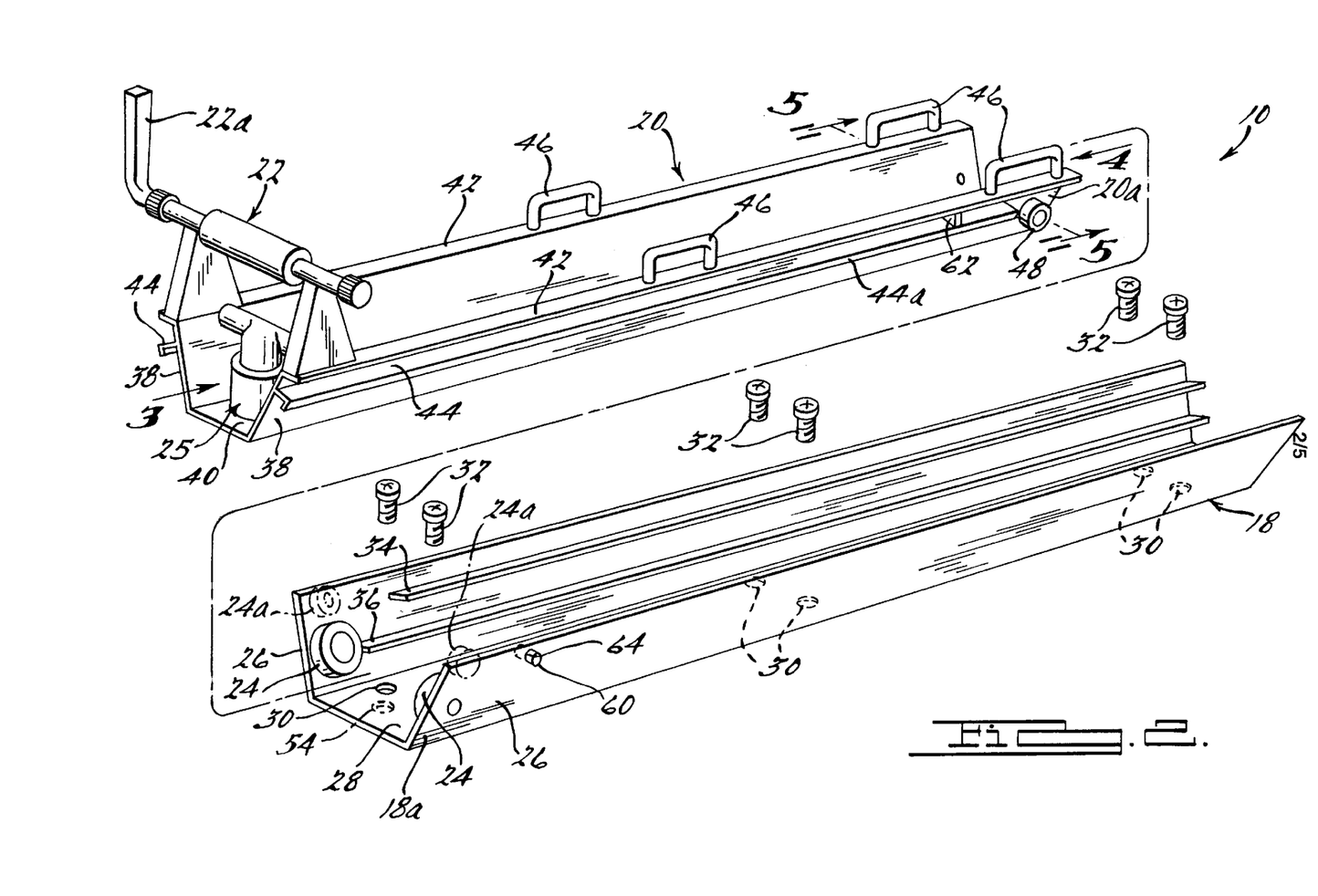
FIG. 2 is an exploded perspective view of the various components of the apparatus of FIG. 1.
Figure 3:
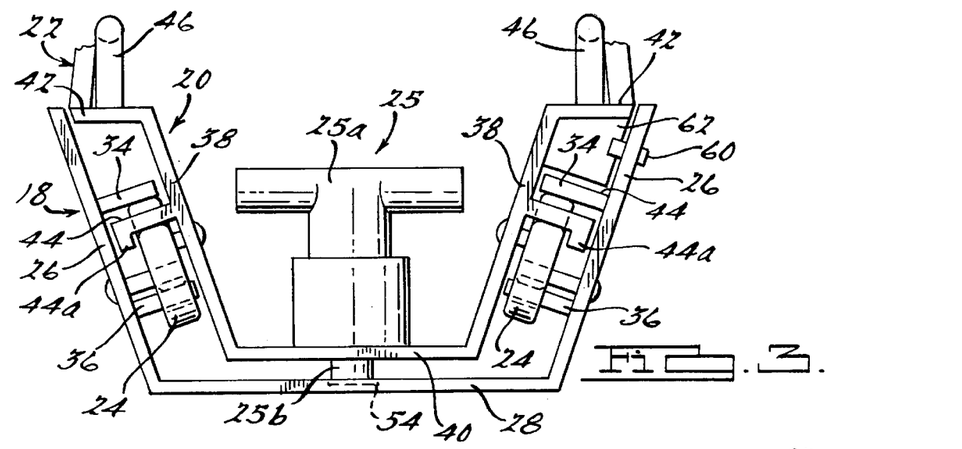
FIG. 3 is an assembled front end view of the bicycle carrier apparatus taken in accordance with directional arrow 3, with only a portion of the securing mechanism shown.

Referring now to FIGS. 2 and 3, the lower rail 18 can be seen to include a pair of rollers 24 mounted for rotational movement on wall portions 26 of the lower rail. A bottom wall 28 includes a plurality of apertures 30 for enabling fastening elements 32 to be used to secure the bottom rail 18 to the floor 14a of the cargo area 14 (FIG. 1). The wall portions 26 further include a pair of upper flanges 34 facing inwardly toward each other and a pair of lower flanges 36 integrally formed with the wall portions 26 and extending parallel to the upper flanges 34.

Referring further to FIGS. 2 and 3, the upper rail 20 includes a pair of wall portions 38 extending upwardly and outwardly of a bottom wall 40. Each of the wall portions 38 includes an upper flange 42 and a lower flange 44. Preferably, the lower flange 44 includes a downwardly turned lip 44a. Optionally, a plurality of tie down loops 46 may be provided on the upper flanges 42 so that external fastening straps such as bunge cords can be used to secure the removed front wheel of the bicycle 12 (FIG. 1) to the remainder of the bicycle. The bottom wall 40 includes the fork securing mechanism 22 which may be brazed onto the bottom wall 40. It will be appreciated, however, that this mechanism could be fastened by other means, such as a combination of a threaded nut and bolt, to the bottom wall 40. Each of the lower and upper rails 18 and 20, respectively, are made from a lightweight, high strength material such as aluminum and may be formed from a variety of conventional manufacturing practices such as by extrusion molding.

Figure 4:
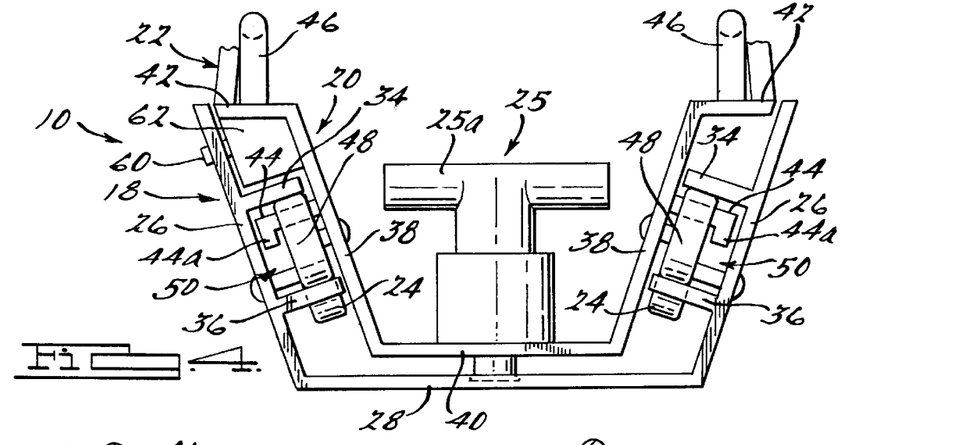
FIG. 4 is a rear end view of just the upper rail with only a portion of the securing mechanism shown.

With brief reference now to FIGS. 2 and 4, it can be seen that the upper rail 20 also includes a pair of rollers 48 which are secured to the wall portions 38. Rollers 48 and rollers 24 preferably comprise nylon rollers. It will be appreciated, however, that a wide variety of other roller assemblies could be employed. The rollers 48 and 24, however, do not require ball bearings.

Figure 5:
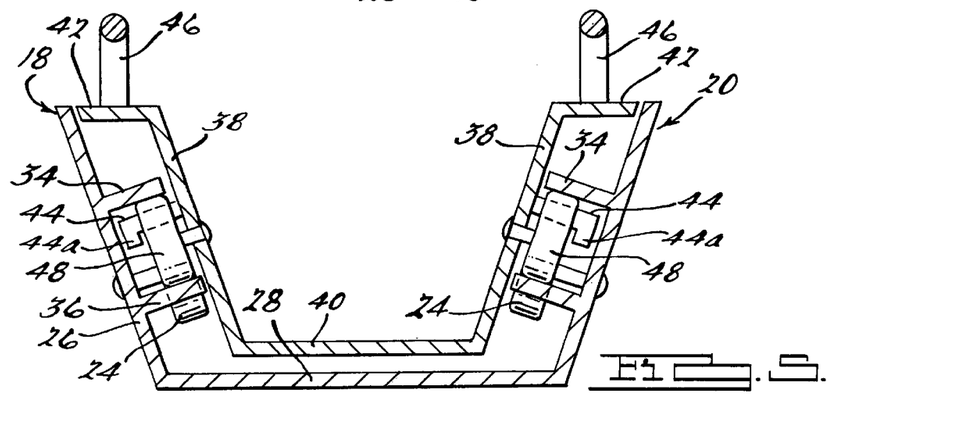
FIG. 5 is a cross sectional view taken in accordance with section line 5—5 in FIG. 2 showing the rollers of the upper elongated rail in contact with the corresponding pair of upper flanges formed on the lower elongated rail with only a portion of the securing mechanism shown.

Referring again to FIG. 3, it can be seen that the lower flanges 44 of the upper rail 20 rest on the rollers 24 when the upper rail 20 is assembled to the lower rail 18. In FIG. 4, the rollers 48 ride within the channels 50 formed by the upper and lower flanges 34 and 36, respectively on each wall portion 26 of the lower rail 18. Importantly, as seen in FIG. 5, the rollers 48 engage the upper flanges 34 as the upper rail 20 is pulled outwardly of the lower rail to help maintain the upper rail 20 in a generally horizontal position as it is extended and to further enable smooth sliding movement of the upper rail 20 relative to the lower rail 18. Optionally, a second pair of rollers 24a may be disposed on the wall portions 26 adjacent rollers 24 to capture the lower flanges 34 therebetween and thus provide an even more positive sliding action for the upper rail 20.

Referring further to FIG. 2, it will be noted that the upper flanges 34 of the lower rail 18 terminate at a more rearward position than the lower flanges 36. This enables a rear portion 20a of the upper rail 20 to be inserted into the lower rail 18 by positioning the rollers 48 on the lower flanges 36 at a forward end 18a of the lower rail 18, while holding the upper rail 20 such that its forward end 20b is elevated above the rear end 20a. The upper rail 20 can then be slidably inserted into the lower rail 18 as the front portion 20b of the upper roller 20 is lowered while pushing the upper rail 20 into the lower rail 18.

The ability to completely remove the upper rail 20 from the lower rail 18 also permits the loading and unloading of the bicycle 12 (FIG. 1) to be accomplished by first removing the entire upper rail 20 from the apparatus 10, placing it on a ground surface, and then attaching the bicycle 12 to the upper rail 20 before again reinserting the upper rail 20 into the lower rail 18. Since the upper rail 20 is completely removable from the lower rail 18, it can be removed when the apparatus 10 is not in use.

It will be appreciated that locking mechanism 25 could take a wide variety of forms. Virtually any suitable locking structure could be included to lock the upper rail 20 in place on the lower rail 18 so that no unintended movement of the upper rail 20 relative to the lower rail 18 can occur when the bicycle 12 is secured on the apparatus 10. Locking mechanism 25, in one presently preferred embodiment, however, is formed by a mechanism that requires the user to pull upwardly on a T-shaped portion 25a (FIGS. 3–5) against the biasing force of an internal spring engaged with a vertically disposed locking pin 25b. The locking pin 25b is engaged within a detent or opening 54 at the front end 18a of the lower rail 18. In this manner the upper rail 20 is prevented from moving slidably along the lower rail 18 unless the user pulls upwardly on the T-shaped portion 25a to release the latching mechanism 25 and pulls the upper rail 20 outwardly slightly to clear the opening 54.

It will also be appreciated that some suitable structure is preferably included to prevent the upper rail 20 from being extended out from the lower rail 18 beyond a predetermined point without first manually engaging a release portion. This would ensure that the upper rail 20 is not pulled out too far from the lower rail 18. In the preferred embodiment, as shown in FIG. 2 this feature is implemented by a stop member 60 included on the lower rail 18 and a stop wall 62 included on the upper rail 20. The stop member 60 may be threaded through a threaded opening 64 in one wall portion 26. The outer end of this member 60 engages the stop wall 62 at a predetermined point when the upper rail 20 is withdrawn. The stop wall 62 can be brazed or otherwise fixedly secured to the upper rail 20. Complete removal of the upper rail 20 can thus only be accomplished by first removing the stop member 60.

Figure 6:
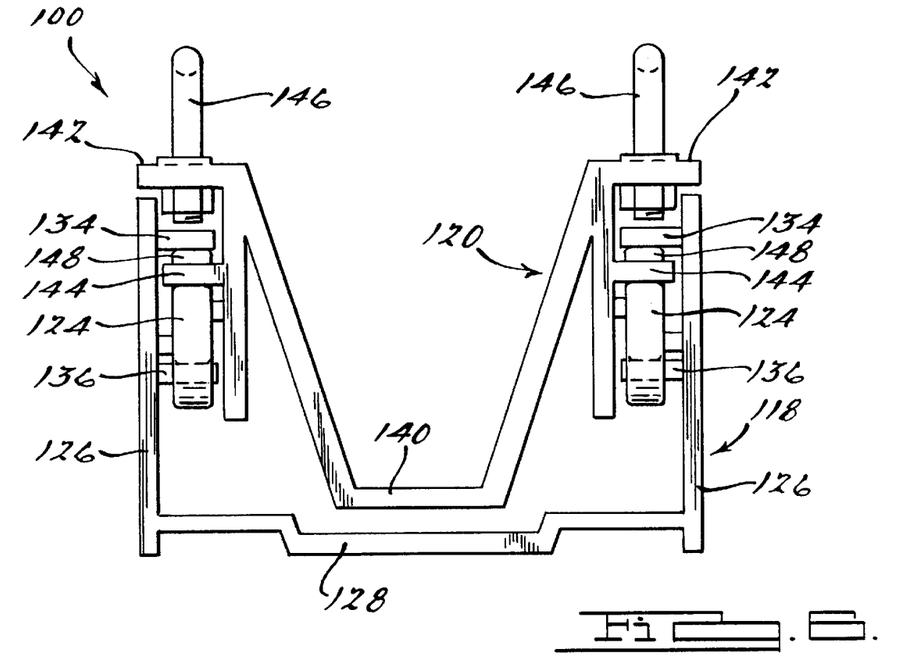
FIG. 6 is a front end view of an alternative preferred embodiment of the bicycle carrier apparatus of the present invention.

Referring now to FIG. 6, a bicycle carrying apparatus 100 in accordance with an alternative preferred embodiment of the present invention can be seen. The apparatus 100 is substantially similar to the apparatus 10 and common components will be denoted by reference numerals increased by a value of 100.

Apparatus 100 principally includes a much deeper, V-shaped upper rail 120. A lower rail 118 includes a wide bottom wall 128 and forms a generally larger component, when viewed in cross section, than lower rail 18. The lower rail 118 similarly includes upper flanges 134 and lower flanges 136. Rollers 124 support the upper rail 120 for sliding movement on lower flanges 144 of the upper rail 120. A pair of rollers 148 are also associated with the upper rail 120 and operate in the identical manner to rollers 48 of the upper rail 20.

Figure 7:
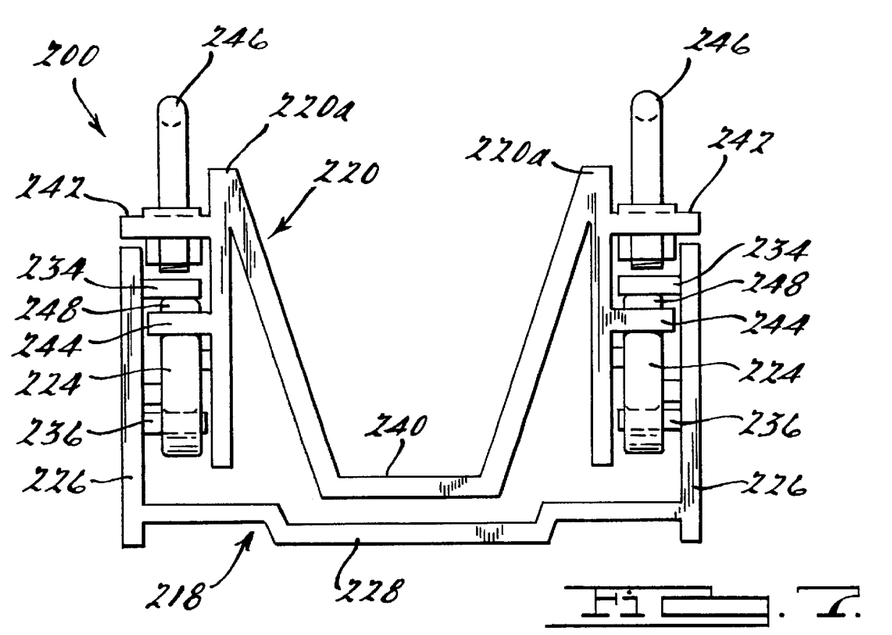
FIG. 7 is another alternative preferred embodiment of the bicycle carrier apparatus of the present invention.

Referring to FIG. 7, an apparatus 200 in accordance with another alternative preferred embodiment of the present invention is shown. Common components with the apparatus 10 are denoted by reference numerals increased by a value of 200. The apparatus 200 is substantially similar to the apparatus 100 of the principal exception of an upper rail 220 having portions 220a which extend slightly above upper flanges 242 to provide an even deeper, more pronounced V-shaped groove for accepting the rear wheel of a bicycle. The apparatus 200 is otherwise identical in construction to the apparatus 100.

Figure 8:
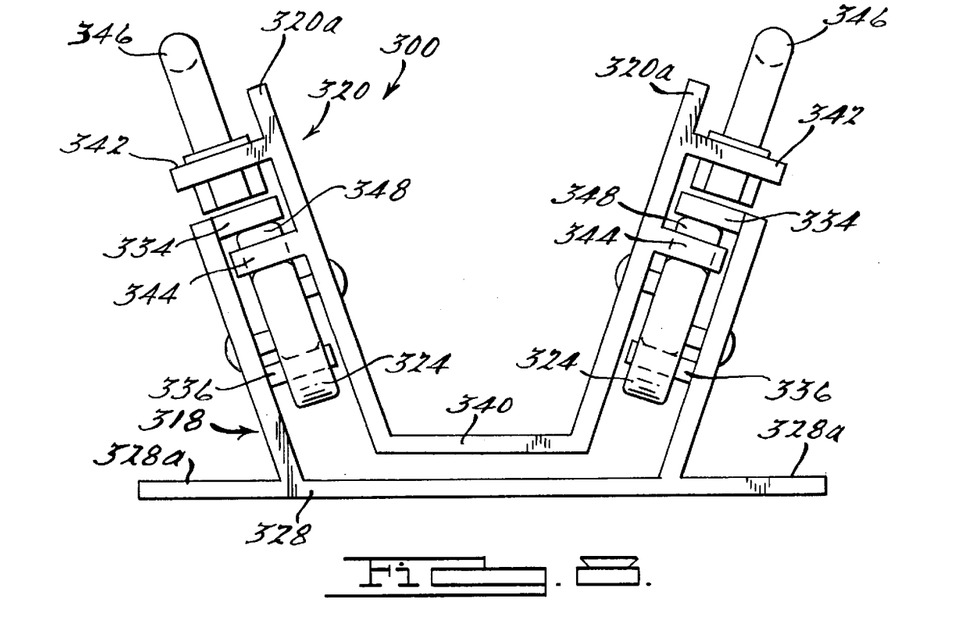
FIG. 8 is an assembled end view of yet another alternative preferred embodiment of the bicycle carrier apparatus of the present invention.

Referring now to FIG. 8, an apparatus 300 in accordance with yet another alternative preferred embodiment of the present invention is shown. Again, common components with the apparatus 10 are denoted by reference numerals increased by a value of 300. The apparatus 300 is identical in construction to the apparatus 10 with the exception that the upper rail 320 includes upper edge portions 320a which help to form an even deeper, more pronounced V-shaped groove for the upper rail. Also, the bottom wall 328 of the lower rail 318 includes a pair of outwardly extending base flanges 328a which provide even further stability to the lower rail 318 when same is mounted to the floor 14a (FIG. 1) of the cargo area 14 of the vehicle 16.

Figure 9:
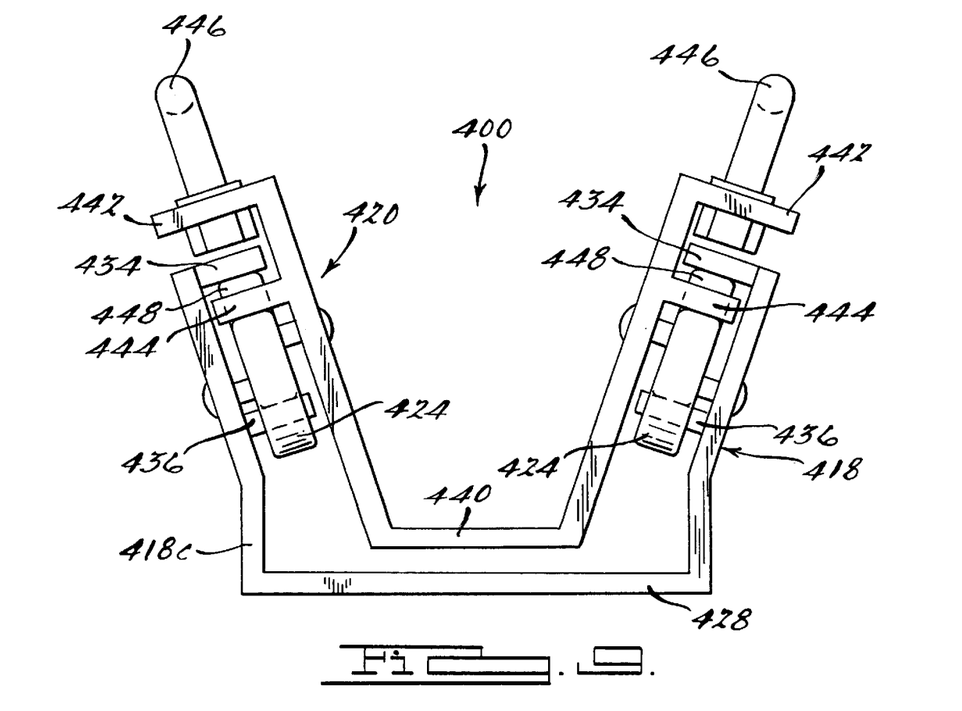
FIG. 9 is an end assembled view of another alternative preferred embodiment of the bicycle carrier apparatus of the present invention.

Referring now to FIG. 9, an apparatus 400 in accordance with yet another alternative preferred embodiment of the present invention is shown. Apparatus 400 is substantially identical to the apparatuses 10 and 300 and common components with the apparatus 10 are denoted by reference numerals increased by a value of 400. The apparatus 400 is identical with the apparatus 300 with the exception that the lower rail 418 includes a generally "squared off" lower portion 418c which helps to provide stable mounting of the lower rail 418 to the floor 14a of the cargo area 14 but without the visibility of flange portions 328a of the apparatus 300. The operation of the apparatus 400 is otherwise identical with that of apparatus 300. It will also be understood that the securing mechanism 22 has been omitted from the drawings of FIGS. 6–9.

It will be appreciated then that the various preferred embodiments of the present invention provide a means for supporting a bicycle in an upright position within a cargo area of the vehicle, and which also permit loading and unloading of the bicycle thereon without the user being required to climb into the cargo area during the loading or unloading process. The preferred embodiments of the present invention provide a very compact, stable means for supporting a bicycle in a cargo area of a vehicle. Advantageously, the preferred embodiments enable a bicycle to be stored within the cargo area, which eliminates the need for complicated, obtrusive and inconvenient bicycle support assemblies to be secured to the rear bumper of the vehicle, which often impedes access to the cargo area. Mounting of the bicycle(s) inside the cargo area also reduces the risk of theft, as well as the possibility of damage to the bicycle(s) that could otherwise occur if same were exposed to rain, hail or other elements while travelling.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An apparatus adapted to carry at least one bicycle within an interior cargo area of a motor vehicle, in an upright orientation, and in a manner enabling said bicycle to be loaded onto and unloaded from said apparatus at a position at least partially outside of said interior cargo area, to thereby ease loading and unloading of said bicycle from said interior cargo area, said apparatus comprising:
   a first elongated rail adapted to be fixedly secured to a floor of said cargo area;
   a second elongated rail secured to said first elongated rail for sliding movement along said first elongated rail, said second elongated rail being further adapted to receive at least one bicycle wheel of said bicycle therein;
   said second elongated rail further including a mechanism adapted to releasably engage a fork of said bicycle such that said bicycle is supported in said upright orientation on said second elongated rail;
   wherein said second elongated rail is linearly extendable in sliding fashion relative to said first elongated rail such that at least a significant portion of said bicycle, when secured to said second elongated rail, can be positioned outside of said interior cargo area to thereby ease loading and unloading of said bicycle onto or off of said second elongated rail; and
   wherein said second elongated rail includes:
      a generally U-shaped rail forming a second channel; and
      at least one roller disposed at a rear end thereof for engaging a portion of said first elongated channel to facilitate linear sliding movement of said second elongated rail relative to said first elongated rail.

2. The apparatus of claim 1, wherein said first elongated rail comprises a generally U-shaped rail forming a first channel having at least one longitudinally extending flange projecting into said first channel.

3. The apparatus of claim 1, wherein:
   said first elongated rail comprises at least one first roller disposed thereon adjacent one outermost end thereof; and
   said second elongated rail comprises at least one second roller disposed thereon adjacent an outermost end thereof opposite to said outermost end of said first elongated rail portion; and
   said first and second rollers cooperating to enable sliding movement of said second elongated rail along said first elongated rail.

4. The apparatus of claim 3, wherein said first elongated rail includes a longitudinally extending flange adapted to engage said one second roller of said second elongated rail to maintain said second elongated rail in a generally horizontally level position when said second elongated rail is withdrawn to a fully extended position outwardly of said cargo area.

5. The apparatus of claim 4, wherein:
   said first elongated rail comprises a pair of first rollers; and
   wherein said second elongated rail comprises a pair of second rollers.

6. The apparatus of claim 5, wherein:
   said first elongated rail comprises a second longitudinally extending flange extending generally parallel to said first flange; and
   wherein said pair of second said rollers is disposed so as to ride in between said first and second flanges when said second elongated rail is extended outwardly of said first elongated rail.

7. The apparatus of claim 1, wherein said mechanism for engaging said fork of said bicycle comprises a mechanism for engaging outermost ends of said fork for enabling quick locking and releasing of said fork to and from said second elongated rail.

8. An extendable/retractable bicycle supporting apparatus adapted to carry a bicycle within a cargo area of a motor vehicle, in an upright orientation, and in a manner enabling said bicycle to be loaded onto and unloaded from said apparatus at a position at least partially outside of said cargo area, to thereby ease loading and unloading of said bicycle from said cargo area, said apparatus comprising:
   generally U-shaped, first elongated rail adapted to be fixedly secured to a floor of said cargo area;
   a generally U-shaped, second elongated rail secured to said first elongated rail for sliding movement along said first elongated rail and further adapted to receive at least a rear wheel of said bicycle therein;
   said first elongated rail including at least one roller disposed adjacent a first end of said apparatus;
   said second elongated rail including at least one roller disposed adjacent a second end of said apparatus;
   said rollers of said elongated rails being operable to facilitate easy sliding movement of said second elongated rail along said first elongated rail;
   said second elongated rail further including a mechanism adapted to releasably support a front fork of said bicycle adjacent said first end of said apparatus after a front wheel of said bicycle is removed, and adapted to support said rear wheel of said bicycle adjacent said second end of said apparatus; and
   wherein said second elongated rail is linearly extendable into an extended position in sliding fashion relative to said first elongated rail, such that at least a significant portion of said second elongated rail can be positioned outside of said cargo area to thereby ease loading and unloading of said bicycle thereon or thereoff of without requiring removal or disassembly of any portion of said apparatus from said cargo area of said vehicle.

9. The apparatus of claim 8, wherein:
   said first elongated rail includes a pair of first rollers; and
   said second elongated rail includes a pair of second rollers.

10. The apparatus of claims 8, wherein:
   said first elongated rail includes at least one longitudinally extending flange; and
   wherein said flange is adapted to engage with said one second roller of said second elongated rail to maintain said second elongated rail in a generally horizontal position when said second elongated rail is moved into said extended position.

11. The apparatus of claim 10, wherein:

said second elongated rail includes a pair of second rollers; and said first elongated rail includes a pair of flanges facing toward each other for engaging said pair of second rollers of said second elongated rail.

12. The apparatus of claim 8, wherein said second elongated rail includes at least one tie down loop for enabling for an external strap element to be secured thereto and to a portion of said bicycle when said bicycle is disposed on said second elongated rail.

13. The apparatus of claim 11, wherein:

said first elongated rail includes two pairs of flanges, with each said pair formed so as to face toward each other; and said two pairs of flanges forming a pair of parallel, longitudinal paths between which said rollers of said second elongated rail move when said second elongated rail is slidably extended from said first elongated rail.

14. The apparatus of claim 8, wherein said second elongated rail includes at least one elongated, longitudinally extending flange adapted to ride on said one first roller of said first elongated rail.

15. The apparatus of claim 8, wherein:

said second elongated rail includes a pair of elongated, facing flanges; and wherein said first elongated rail includes a pair of said rollers; and wherein said pair of elongated, facing flanges is supported by said rollers to facilitate sliding movement of said second elongated rail along said first elongated rail.

16. A bicycle carrier adapted for use within a cargo area of a motor vehicle for holding a bicycle in an upright orientation, and for easing loading and unloading of said bicycle onto said bicycle carrier by enabling a portion of said carrier to be extended outwardly of said cargo area during loading of said bicycle onto said bicycle carrier, said bicycle carrier comprising:

a first elongated rail adapted to be fixedly secured to a floor of said cargo area and having a longitudinal flange extending along a portion of a length thereof;

a first pair of rollers associated with said first elongated rail;

a second elongated rail adapted to support both a rear tire and a front fork of said bicycle after a front tire of said bicycle has been removed, said second elongated rail being moveable along said first pair of rollers between an extended position, wherein said bicycle can be easily loaded thereunto, and a retracted position, wherein said bicycle is positioned completely within said cargo area;

a second pair of rollers operably associated with said second elongated rail and engageable with said flange of said first elongated rail to assist in maintaining said second elongated rail in a generally horizontal orientation when said second elongated rail is in said extended position.

17. The bicycle carrier of claim 16, further comprising a third plurality of rollers operably associated with said first elongated rail for assisting in providing sliding movement of said second elongated rail.

* * * * *